March 14, 1933.  P. C. WARD  1,901,617
TIME LIMIT RELAY
Original Filed Dec. 7, 1928
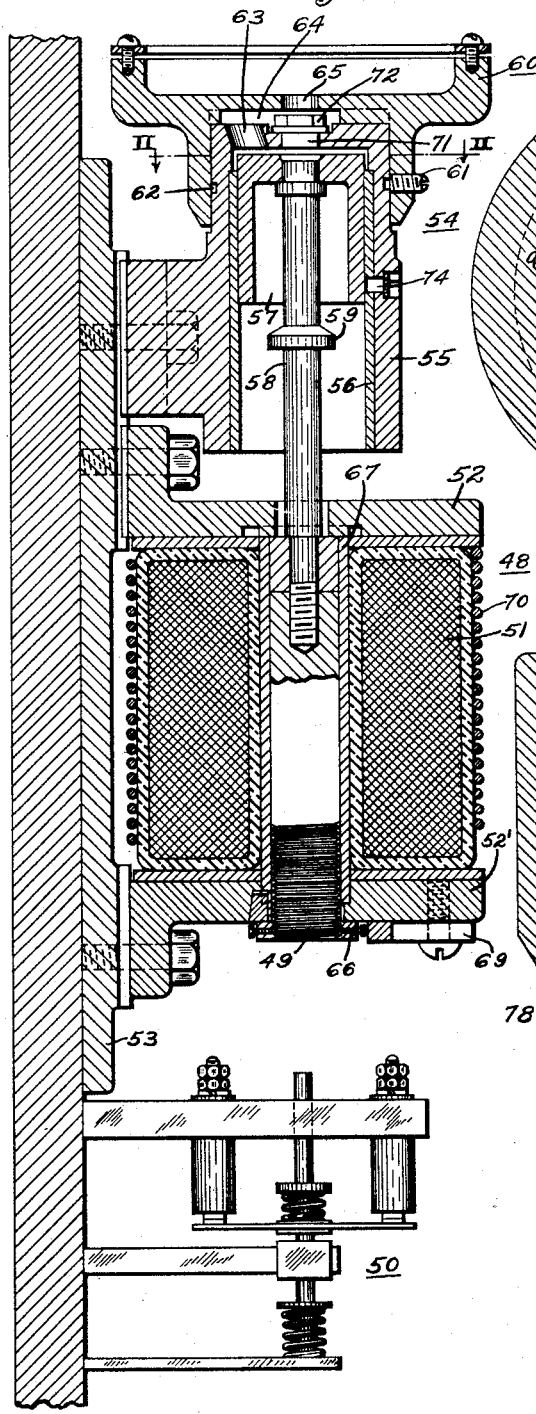
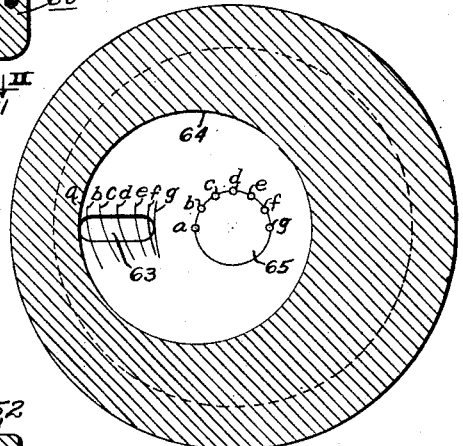
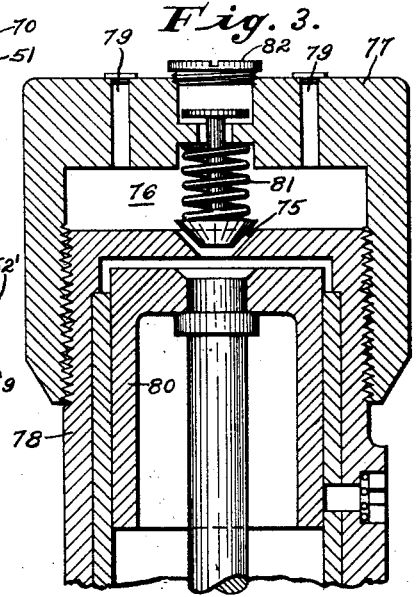
INVENTOR
Patrick C. Ward
BY
Wesley G. Carr
ATTORNEY Patented Mar. 14, 1933

1,901,617

UNITED STATES PATENT OFFICE

PATRICK C. WARD, OF HOMEVILLE, PENNSYLVANIA

TIME LIMIT RELAY

Original application filed December 7, 1928, Serial No. 324,543. Divided and this application filed November 1, 1929. Serial No. 404,065.

This application is a division of my application Serial No. 324,543, filed December 7, 1928.

This invention relates to time-limit control devices for controlling the extent of rotation of motors operating the feeding mechanism for reciprocating devices, such as are found in planers, shapers, saw mills or the like.

An object of the invention is to provide means for controlling the feed operation of a reciprocating device to effect a definite movement of the device to a new position at the end of a stroke by regulating to a high degree of accuracy the number of revolutions of the feed motor for each operation.

A further object of this invention is the provision of a retarding device especially adapted to control the time of closure of an electric circuit by an electric switch.

Another object of the invention is the provision of a time-limit relay designed to automatically and exactly synchronize its own deenergization with the starting of the device controlled by the relay.

A more specific object of the invention is the provision of a time-limit relay wherein the flux distribution in the relay core may be varied; wherein the load-setting, that is, the retarding force on the relay core, may be adjusted to any predetermined value; wherein the total distance of travel of the relay core may be definitely adjusted by turning one of the cooperating members of the time-element or retarding device; and wherein means are provided in the retarding device for giving a quick action after a predetermined interval of time, as determined by the setting of adjustment of the distance of travel of the relay core.

For a specific application of the invention herein presented, attention is called to applicant's copending application, Serial No. 324,543, filed December 7, 1928, of which this application constitutes a division.

In practicing my invention, I provide a relay of the solenoid type having a magnetizable core member and a pair of concentric windings. The outer of the two windings constitutes the compensating winding and is adapted to be inserted in the load circuit of the electric device the relay is designed to control. The number of turns of the compensating winding in relation to the inner winding and the device controlled is so adjusted that the deenergization of the time-limit relay takes place in exact synchronism with the beginning of operation of the device controlled. A cylindrical dashpot is mounted adjacent the coil provided with a loosely fitting piston secured by a stem to the relay core. The dash-pot cylinder is provided with an elongated orifice, the opening of which is varied by a cup-shaped member fitting over the orificed end of the dash-pot cylinder. The core-end remote from the stem is provided with an adjustable ring for varying the total distance of travel of the piston.

The novel features of this invention will be definitely indicated in the claims appended hereto, while the features of construction and the mode of operation will be understood by reference to the following description taken in connection with the accompanying drawing which shows the preferred embodiment of this invention and in which:

Figure 1 is a vertical sectional view of my improved time-limit relay.

Fig. 2 is an enlarged somewhat diagrammatic sectional view taken along the lines II—II of Fig. 1, showing in detail the outlines of the intake and exhaust orifices in the dash-pot and the manner in which the movement of the adjustable cap member varies the effective area of the intake orifice, and Fig. 3 is a vertical sectional view showing a modification of the dash-pot shown in Fig. 1.

Referring now to the drawing and particularly to Fig. 1, the control relay comprises an electromagnet 48, having a movable core or plunger 49, which may be utilized to effect the opening of any circuit controlling switch, such as indicated at 50. In this instance only a single-contact switch has been shown, but it will be readily understood that as many contact members may be provided on the switch 50 as may be required for performing the necessary control operations.

The electromagnet 48, in addition to the movable plunger 49, comprises an operating coil 51, which may be energized to actuate the plunger 49 to the raised position as shown. The operating coil 51 may be of the usual form-wound type, supported in the position shown, by means of metal brackets 52 and 52', which are bolted to the base member 53, in any suitable manner.

In order to provide for controlling the time required for the relay plunger 49 to fall from a raised position as shown in the drawing, to a point at which the switch 50 is actuated in response to the deenergization of the operating coil 51, a dash pot 54 is utilized. It will be readily understood, that, since the plunger 49 when released by the coil 51 is influenced by the force of gravity alone, the time element will depend upon the weight of the plunger and the distance it must fall to the full open position. Without any dash pot or retarding means exerting a restraining force in opposition to the force of gravity a minimum time element is obtained which, in most instances, is of too short a duration to be of any practical value.

In this embodiment of the invention, the dash pot 54 is so arranged that the time element of the relay may be readily adjusted between relatively wide limits. As shown, the dash pot 54 comprises a cylinder member 55 which may be secured to the base member 53 in any suitable manner. The bore of the cylinder 55 is provided with a liner 56 which is adapted to receive a piston member 57. The piston 57 is preferably formed of the same material as the liner 56, and may be fitted to the bore with considerable clearance for a purpose which will be described in detail hereinafter.

As shown, the piston 57 is connected to the plunger 49 by means of a suitable connecting member 58.

In order to limit the downward travel of the plunger and piston, the connecting member 58 is provided with a shoulder portion 59, which in its lower position engages the upper bracket member 52. As will be readily understood the upward movement of the plunger and piston is limited by a shoulder portion formed by the upper end of the plunger 49 which is disposed to engage the upper bracket member 52, as shown.

In order to control the operation of the dash pot 54 to vary the length of the time element from minimum to maximum values, the dash pot is provided with a rotatable-cap member 60, as shown. The cap member 60 rests firmly upon the top of the dash-pot cylinder 55, and is held in position by means of a set screw 61 which engages a groove 62 extending circumferentially around the outside periphery of the cylinder 55.

In order that a control fluid such as air, may be drawn into the cylinder in response to the downward movement of the piston 57, the cylinder top is provided with an elongated intake orifice 63. As shown the intake orifice 63 communicates between the interior of the cylinder 55, and the outside air through a passage comprising a recessed portion 64 in the face of the cap member 60 and a central opening 65.

Referring to Fig. 2, it will be observed that the recessed portion of the cap member 60 is of circular shape, and positioned eccentrically, with respect to the center of the cap. It will be readily understood that the effective area of the intake orifice 63 may be varied, by rotating the cap member 60 to the various positions designated as $a$ to $g$, inclusive, as shown. Due to the eccentricity of the recessed portion 64, very small changes in the effective area of the intake orifice may be obtained by rotating the cap member 60, which provides for a fine and accurately controlled adjustment of the time element of the relay.

In describing the operation of the relay it may be assumed that the operating coil 51 is energized. In this instance the plunger 49 is held in the "up" position, as shown. When the plunger is released by the coil 51, the force of gravity immediately effects its movement in a downward direction. Consequently the dash-pot piston 57 is pulled downwardly and creates a partial vacuum in the cylinder 55. In accordance with a well known principle; the control fluid which is preferably of gaseous nature such as air is caused to flow into the cylinder through the central opening 65, passage 64, and intake orifice 63.

It will be readily understood, that the restraining force exerted upon the plunger 49, by the piston 57, will depend upon the rate with which air enters the dash-pot cylinder 55. Since the size of the intake orifice 63 may be readily adjusted, it is evident that the rate with which air enters the cylinder, and consequently the restraining force exerted by the piston, against the force of gravity, may be varied to provide the desired time element by adjusting the cap member 60 in the proper position as described in detail hereinbefore.

As stated hereinbefore, a definite amount of clearance may be provided between the piston 57, and the cylinder liner 56, in order that a certain amount of air may escape from the cylinder through the cylindrical passage thus formed. It will be readily understood that the air in this passage, provides an air cushion between the piston, and the cylinder walls, and functions in many respects as a lubricant.

It will be evident that the air cushion thus formed performs a function which would not be possible to obtain from the use of an ordinary lubricant, since the viscosity of any lubricant necessarily varies in accordance with temperature conditions, causing an appreciable variation of the friction force. Furthermore, the absence of lubricant in the dash-pot cylinder prevents the collection of dust particles, which, if allowed to remain and collect upon the cylinder walls, would seriously interfere with the accurate adjustment and operation of the relay.

In some instances, auxiliary means for controlling the time element of the relay may be required, when even the smallest movement of the cap member 60 effects too great a change in the time element. In order to provide for an auxiliary adjusting means, provision is made for varying the total distance which the plunger must fall when released by the coil 51, thus interposing a distance time element upon the time element produced by the dash pot 54. In this instance the distance time element may be controlled by utilizing an adjusting nut 66, which is disposed to engage a threaded portion of the plunger 49 as shown. It will be readily understood that the adjusting nut 66 is disposed to engage the lower bracket member 52' and thereby limit the upward movement of the plunger.

In order to prevent the plunger 49 from binding and sticking against the metallic coil liner 67, provision is made for controlling the distribution of the flux in the magnetic circuit of the relay. As shown, this function is performed by utilizing a plate 69 of paramagnetic metal, which may be adjustably secured to the bottom side of the lower bracket 52, in any suitable manner.

In some instances, the intake orifice 63 may be nearly closed to provide a relatively long time element. Accordingly the upward movement of the piston member 57, in response to the coil 51, compresses the air contained in the dash pot cylinder 55 and establishes a back pressure which may interfere with the resetting operation of the relay. In order to provide for reducing the pressure set up by the piston 57, the cylinder head is provided with an exhaust port 71, which is controlled by a suitable check valve 72. As will be readily understood, the pressure of the air inside the dash pot cylinder 55 raises the check valve 72, permitting the air to escape to the outside, through the passage formed by the recess 64 and central opening 65.

In order to prevent dust particles and other foreign matter from being carried into the dash pot chamber by the air which enters the cylinder upon the down stroke of the piston 57, the cap member 60 is provided with a screen 73, as shown.

It will be observed that a passage 74 is provided in the dash pot cylinder 55 in a position directly above the top of the piston 57, when in its lowermost position. This port provides for quickly releasing the piston when it is near its open position, and insures that the plunger 49 will always drop to the full open position to effect the operation of the switch 50.

It will be readily understood that the design of the dash pot 54 as shown in Fig. 1 may be changed to effect the control of the intake fluid in various other ways, such for example, as shown in Fig. 5. It will be observed, that this modification is the same as that shown in Fig. 1, with the exception, that the cylinder head is provided with a single conical-shaped port 75, which is controlled by means of a spring-biased valve 76, supported and controlled by the cap member 77. In this instance, the size of the intake orifice may be varied by rotating the cap member 77, which is in threaded engagement with the dash pot cylinder 78, as shown. A plurality of screened air passages 79 are provided in the top of the cap member 77 for permitting air to flow into the dash pot cylinder in response to the suction created by the downward movement of the piston 80.

In the operation of the relay as shown in this modification, it will be readily understood, that the upward movement of the piston 80 compresses the air in the dash pot cylinder and effects the opening of the valve 76 which permits the escape of air quickly from the cylinder, through the passages 79, to the outside. The upward movement of the valve member 76 may be limited by means of a cap screen 82, as shown. When the piston comes to rest, the valve 76 immediately closes under the action of its biasing spring 81, and regulates the size of the intake orifice in accordance with the adjusted position of the cap member 77.

The load current of one of the electric devices, such as a pair of motors controlled by the time-element relay passes through the compensating coil 70 and thus provides means for maintaining the speed of operation of the motors or other device in a constant predetermined ratio. It will be readily understood, that under some operating conditions, the load on the motor, having coil 70 in its circuit, will vary from time to time even though the motor be performing the same operation. This variation in load is due to several causes, the most important of which are machine friction and unbalanced load. The friction load of the machine driven by the motor having coil 70 in the load line will vary in accordance with the temperature and well-known factors, while the unbalanced load is an inherent characteristic of the machine. It has been found that, by properly regulating the magnetic force exerted between compensated coil 70, that the time of operation of the relay may be synchronized with that of the motor. That is, if the operation of the motor is sluggish, caused by an excessive load, the time element of the relay is lengthened automatically due to the restraining force exerted by the compensating coil without changing the setting of the dash pot.

It may be stated in conclusion, that, while the illustrated example constitutes a practical embodiment of my invention, I do not wish to limit myself strictly to the exact details herein illustrated since modifications of the same may be made without departing from the spirit of the invention as defined in the appended claims.

I claim as my invention:

1. In a time-limit relay, in combination, a switch-actuating plunger, a coil for raising the plunger, said plunger being disposed to fall freely under the influence of the force of gravity when released by the coil, an air dash-pot being provided with a piston disposed to retard the plunger when falling under the influence of gravity, said dash-pot being provided with a rotatable cap member for regulating the flow of air into the dash-pot, and pressure actuated means disposed to permit a ready escapement of air from the dash-pot when the piston is moved upwardly, said means being closed by the force of gravity when the piston is stopped in any position.

2. In a time-limit relay, in combination, a plunger, a coil for lifting the plunger, said plunger being disposed to fall freely to a predetermined lower position under the influence of gravity when released by the coil, a dash-pot for controlling the downward movement of the plunger when released by the coil, said dash-pot comprising a stationary cylindrical member provided with an air intake orifice, a piston member secured to the plunger, said piston having a solid top surface whereby air is drawn through the intake orifice in response to the downward movement of the piston, and a rotatably mounted cap member carried by the cylindrical member for varying the effective area of the intake orifice of the cylindrical member, thereby to control the time required for the plunger and piston to fall to said predetermined lower position.

3. In a time-limit relay, in combination, a plunger, a coil for lifting the plunger, said plunger being disposed to drop under the influence of gravity when released by the coil, a dash-pot connected to the plunger for retarding its movement under the action of gravity, said dash-pot being provided with an orifice for the admission of air, and a cap-member rotatably mounted upon said dash-pot, said cap member having a face portion provided with an eccentric depression disposed to cut off different sections of the orifice.

4. A time-limit relay, comprising a plunger, a coil for raising the plunger, an adjustable member at one end of the plunger for fixing the upper limit of travel of the plunger, a dash-pot cylinder mounted adjacent the other end of the plunger, a loosely fitting piston in the cylinder, a stem connecting the plunger and piston, a shoulder on the stem for fixing the lower limit of travel of the piston, said cylinder being provided with an opening in the side-wall of the cylinder a short distance above the lower limit of travel of the piston to prevent any further retardation of the piston after it passes, in its downward movement, a predetermined point above its lowermost position, an elongated radially disposed aperture in the cylinder-head, a cup-shaped member rotatably mounted on the cylinder-head, a circumferential groove on the outer wall of the cylinder, a set-screw in the cup-shaped member cooperating with the groove to thereby hold the cup-shaped member in closely fitting relation with the cylinder said cup-shaped member having a circular eccentrically positioned recess adjacent the cylinder-head and a central opening communicating with the recess whereby the size of the aperture may be accurately varied by the rotation of the cup-shaped member to adjust to a high degree of accuracy the time element of the relay.

5. A control device for an electric motor comprising a support, a relay of the solenoid type mounted thereon including a plunger, a main coil, an auxiliary coil conductively associated with the load circuit of the motor and designed to prevent deenergization of the relay before the starting of the motor, means on the relay for varying the flux distribution thereof, a dash-pot cylinder mounted on the support, a piston loosely fitting into the cylinder, a stem connecting the piston and plunger, said plunger being provided with a shoulder for engaging an element of the support to fix the extreme upper limit of travel of the piston and the stem being provided with a shoulder for engaging an element of the support to fix the extreme lower limit of travel of the piston, adjustable means on the plunger for fixing the upper limit of travel of the piston to any limit lower than the extreme limit, said cylinder being provided at its head near the edge thereof with an aperture for admitting fluid to the cylinder, a rotatably mounted member closely fitting on the cylinder head and having a central opening and an eccentric recess communicating with the opening and aperture, whereby upon rotation of the member the retarding force of the dash-pot may be fixed to any predetermined value and thus determine the time-limit of the dropping of the plunger, and control switches actuated by the dropping of the plunger.

6. A fluid controlled time-limit device for a control relay having a movable core, including a cylinder having a head, a loosely fitting piston in the cylinder operated by the core, the head being provided with an eccentric aperture for the admission of the retarding fluid, a cup-shaped member having a central opening and an eccentric recess communicating with the opening and the aperture rotatably mounted on the head and snugly fitting thereon whereby upon rotation of the cup-shaped member the time-limit of the relay may be accurately adjusted, the cylinder having an opening in the side wall thereof and so positioned to eliminate any retardation of the core near its lower limit of travel, and screens over the central opening of the cup-shaped member and the opening in the side wall of the cylinder.

7. A time-limit control relay for an electric device including a plunger, a main coil for raising the plunger, an auxiliary coil adapted to be connected in the load line of the electric device to be controlled and designed to prevent complete de-energization of the relay upon de-energization of the main coil, whereby the dropping of the plunger is retarded by a force proportional to the load current of the electric device, means on said relay for varying the flux distribution thereof, a fluid-controlled dash-pot for further retarding the dropping of the plunger upon de-energization of the main coil, means for adjusting the retarding force of the dash-pot to fix, for any value of current in the auxiliary coil, to any desired time interval the dropping of the plunger, and control switches actuated by the dropping of the plunger.

In testimony whereof, I have hereunto subscribed my name this 24th day of October, 1929.

PATRICK C. WARD.